(12) United States Patent
Berni et al.

(10) Patent No.: US 9,663,842 B2
(45) Date of Patent: May 30, 2017

(54) SYSTEM AND METHOD FOR RARE EARTHS EXTRACTION

(71) Applicant: VALE S/A, Rio de Janeiro (BR)

(72) Inventors: Tiago Valentim Berni, Belo Horizonte (BR); Antonio Clareti Pereira, Belo Horizonte (BR); Flávia Dutra Mendes, Belo Horizonte (BR); João Alberto Lessa Tude, Salvador (BR)

(73) Assignee: VALE S.A., Rio de Janeiro (BR)

( * ) Notice: Subject to any disclaimer, the term of this patent is extended or adjusted under 35 U.S.C. 154(b) by 204 days.

(21) Appl. No.: 13/887,027

(22) Filed: May 3, 2013

(65) Prior Publication Data

US 2013/0336856 A1    Dec. 19, 2013

Related U.S. Application Data

(60) Provisional application No. 61/643,018, filed on May 4, 2012.

(51) Int. Cl.
C22B 59/00    (2006.01)

(52) U.S. Cl.
CPC ................... *C22B 59/00* (2013.01)

(58) Field of Classification Search
None
See application file for complete search history.

(56) References Cited

U.S. PATENT DOCUMENTS 3,647,361 A * 3/1972 Coltrinari et al. .......... 423/21.1
4,451,438 A * 5/1984 Floeter et al. ................. 423/20

FOREIGN PATENT DOCUMENTS

KR        20030055506 A  *  7/2013
WO   WO 2009021389 A1  *  2/2009

OTHER PUBLICATIONS

Machine English translation of Yoong KR 20010085069 A Jul. 2003.*

* cited by examiner

*Primary Examiner* — Melissa Swain
(74) *Attorney, Agent, or Firm* — Arent Fox LLP (57) ABSTRACT

It is described a method for recovering rare earth elements from low grade ores including a first metal selected group containing at least one of iron and aluminum and a second metal selected from the group consisting of at least of the rare earth elements (lanthanum, cerium, praseodymium, neodymium, promethium, samarium, europium, gadolinium, terbium, dysprosium, holmium, erbium, thulium, ytterbium, lutetium, yttrium and scandium), the method comprising the steps of: (i) contacting the ore with sulfuric acid to obtain sulfates of the first group of metals, (ii) subjecting the mixture to high temperatures in order to convert the first group of sulfates into phosphates or other stable species and the second group into sulfates, (iii) adding water to the cool mixture, selectively dissolving the rare earth elements and (iv) subjecting the rare earth solution to a purification process.

15 Claims, 6 Drawing Sheets

SYSTEM AND METHOD FOR RARE EARTHS EXTRACTION

CROSS-REFERENCE TO RELATED APPLICATIONS

This application is based upon and claims the benefit of priority of the U.S. Patent Application No. 61/643,018, filed May 4, 2012, the disclosure of the prior application is hereby incorporated in its entirety by reference.

The present invention relates to an extractive metallurgical process for low grade rare earth ores containing high levels of iron and/or aluminum.

BACKGROUND OF THE INVENTION

Rare earth elements are defined as a set of seventeen chemical elements from the periodic table, the fifteen lanthanides plus yttrium and scandium. Light rare earths are defined as the first five lanthanides (lanthanum, cerium, praseodymium, neodymium and promethium—the last one being unstable in nature) plus yttrium and scandium. Medium rare earths, or SEG, are samarium, europium and gadolinium, leaving the other seven (terbium, dysprosium, holmium, erbium, thulium, ytterbium and lutetium) as heavy rare earths. Rare earths are moderately available in the earth crust. Some light rare earths are even more abundant than nickel, cobalt or lead.

There are many rare earth-bearing minerals, from primary or secondary formation. Usually, rare earths are explored as by or co-product of another operation. Commercial operations of rare earths as the main product are usually from monazite or bastnasite deposits, being those two the main minerals for the industry.

Rare earths extraction from these minerals is widely known by the industry and is considered state-of-the-art processing. After they are submitted to a mineral concentration stage, known by those skilled in the art, a pure rare earth concentrate is submitted to acid or caustic attacks. These processes work well for monazite or bastnasite concentrates, where the rare earth minerals have a good degree of separation from other impurities, like iron or aluminum. These processes, however, cannot be applied to a deposit where poor mineral concentration is achieved.

Caustic cracking, one of the available processes for attacking monazite concentrates, uses caustic soda to attack the rare earth phosphates, producing rare earth hydroxides and soluble TSP (tri-sodium phosphate), a valuable by-product. This operation usually occurs at 120-150° C. using agitated tanks. After solid-liquid separation, the rare earth hydroxides are leached in HCl and sent to further processing, usually solvent extraction. TSP is removed from the solution by crystallization methods. This process cannot cope with high silicon, aluminum and/or iron concentrates. Aluminum and silicon can be leached by caustic soda consuming reagents and increasing solution viscosity. Iron and these elements can also produce colloids. These effects make operations very difficult as solid-liquid separation becomes a challenge and caustic soda consumption increases considerably.

The other state of art process for monazite, attack with hot and concentrated sulfuric acid, called sulfation, mixes a high amount of concentrated (96-98%) sulfuric acid (several times over stoichiometric amounts) with the rare earth concentrate, heating the mixture around 200-250° C. to increase kinetics. Rare earth sulfates are formed and later dissolved by adding water. The rare earth sulfates are removed from solution as sodium double sulfates or as oxalates. These are attacked with caustic soda, forming hydroxides that are leached with HCl. The HCl solution is usually taken to solvent extraction for proper elements separation. High levels of impurities like iron, aluminum or alkali and earth-alkali elements will increase acid consumption and make solution purification more difficult and costly.

Processes for bastnasite extraction are very similar to monazite sulfation. The concentrate can be attacked with hot sulphuric acid, as the Bayan-Obo process, or with calcination followed by hydrochloric acid leaching, as the Mountain Pass process. The same issues seen for high impurity monazite concentrates using the sulfation method would be seen here as well.

For those reasons, state-of-the-art processes cannot be applied to deposits where poor mineral concentration is obtained. High levels of acid (or caustic) consuming elements make it very difficult to use one of the widely available processes. There have been several developments to try and go around this issue with low grade, high impurity rare earth ores.

One such publication, FR2826667, by Renou & Tognet, is a patent application that teaches that heating a mixture of fine rare earth ore (particle size of 100 µm or smaller), containing high levels of iron, and sulfuric acid, at a ratio of 1 and 2, to a temperature higher than 780° C. but lower than 820° C. for 1 to 3 hours is sufficient to obtain rare earth sulfates that will solubilize without any iron in solution at a later stage where water is added. This invention has several drawbacks, as a high acid consumption (up to 2 times acid to ore ratio) and the need of very high temperatures. The mechanism involved is to convert all species in the ore into sulfates (including the impurities) and decomposing them at high temperatures into insoluble oxides, releasing SOx. This invention takes care of reducing the amount of impurities added but still needs a high amount of sulfuric acid to be added and high temperatures to decompose some of the sulfates formed. Rare earth sulfates may also decompose to some extent, reducing overall extraction rate. It may produce a pure rare earth solution but does not take care of the high acid consumption.

Another document, by Huang et al. (WO 2009/021389), teaches that heating up the acid and ore mixture, at an acid ratio of 1 to 2 times the ore mass, between 231 and 600° C. is enough to obtain a high rare earth extraction with low impurities in solution. This invention applies a much lower temperature than the previous one, but with similar results. This invention increases temperature to dehydrate sulfates of some elements, like iron, but other sulfates, like rare earths, are not yet dehydrated. These dehydrated compounds are not readily soluble, so by controlling conditions during the dissolution stage the inventors can reduce the amount of impurities that are put in solution. As the previous invention, this one does not reduce the amount of sulfuric acid needed, finding only a way of not dissolving the already formed iron sulfate.

Figure 1:
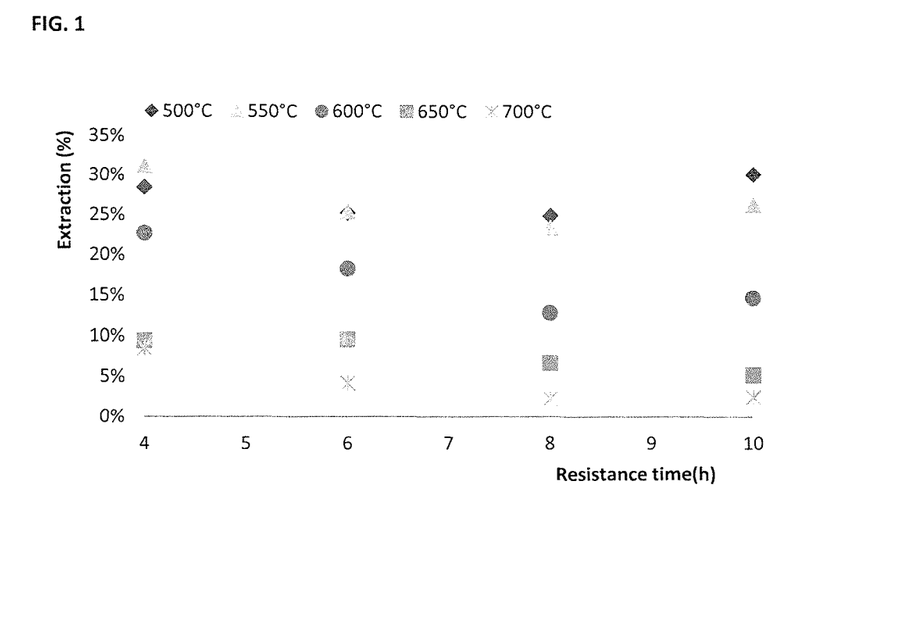
FIG. 1 is a graph illustrating the effect of temperature and time to iron extraction as a function of temperature and time, thus showing conversion of iron from sulfate into phosphate.

The invention presented in this document differs from state of art processing and these other two inventions. The present document brings a process that indirectly attacks rare earth minerals using aluminum and iron sulfates that are formed by adding small quantities of sulfuric acid, enough to attack the said rare earth minerals. This process produces stable species of iron and aluminum, leaving rare earths as soluble species. It is, therefore, an indirect leaching process that attacks rare earth minerals not with sulfuric acid, but with iron and aluminum sulfates. FIG. 1 shows that neither of the discussed inventions are able to obtain similar results, as either iron is not converted into phosphates at low temperatures or rare earth sulfates start to decompose, together with impurities, at higher temperatures.

SUMMARY OF THE INVENTION

A method for recovering rare earth elements from low grade ore, such as, but not limited to, monazite deposits, is provided by the present disclosure. The material must include at least one of the rare earth elements (lanthanum, cerium, praseodymium, neodymium, samarium, europium, gadolinium, terbium, dysprosium, holmium, erbium, thulium, ytterbium and lutetium, added to yttrium and scandium) and at least one of iron or aluminum. The method includes steps of: (i) reducing the ore particle size to a desirable target, (ii) obtaining a concentrate that still carries the mentioned elements, (iii) drying the obtained concentrate or upgraded ore if necessary, (iv) adding sulfuric acid in a sub-stoichiometric amount to obtain sulfates of iron and/or aluminum, (v) submitting the mixture to a high temperature operation, where iron and/or aluminum sulfates react with rare earth minerals, forming soluble rare earth sulfates, (vi) Adding this mix of rare earth sulfates and impurities to water in order to solubilize such compounds selectively and (vii) use any of the known methods available for rare earth separation, such as, but not limited to, solvent extraction.

PREFERRED EMBODIMENT OF THE INVENTION

The present disclosure relates to a process for recovering rare earth elements from low grade ores, especially those that are not susceptible to proper mineral concentration, containing at least one of aluminum and iron, such as ore from a monazite deposit.

In accordance with the present disclosure, the low grade rare earth ore is treated with sulfuric acid, added in a sub-stoichiometric manner, and submitted to high temperature in order to produce an iron and aluminum-free solution that carries rare earths as sulfates.

Figure 5:
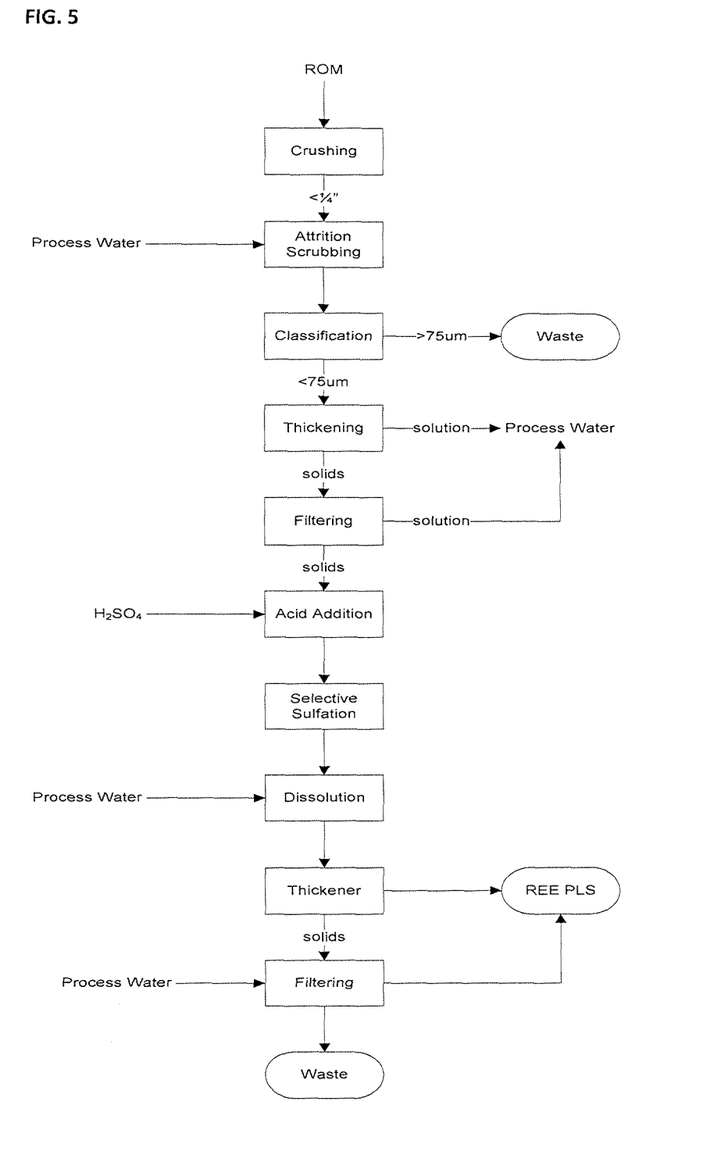
FIG. 5 is a flow chart of a process for extracting rare earth elements from low grade ores according to one embodiment of the present disclosure.

As discussed in more detail below, the low grade ore is initially submitted to a size reduction stage, known by those skilled in the art. The objective of this stage is to liberate the rare earth minerals and to take the ore to a suitable size for further processing. The ore can be also taken to a concentration stage, such as size classification, to increase the ore grade, as long as iron and aluminum are still found in the concentrate. The upgraded ore is added to a small quantity of sulfuric acid, forming ferric and/or aluminum sulfates. The ore may need to be dried before adding sulfuric acid, depending on what upgrading techniques are used. This stage would be necessary to avoid dilution of the concentrated sulfuric acid and to improve operation. The mixture is submitted to a high temperature operation where rare earth sulfates are formed, along with iron and aluminum insoluble and stable compounds that may vary according to the source of rare earths. The calcine is added to water to selectively solubilize the rare earths, leaving iron and aluminum in the residue. The clean solution can then be taken to any downstream processing of rare earths known by those skilled in the art. FIG. 5 illustrates the proposed process.

After the ore is extracted from the mine, it must be taken to a size reduction operation. Any operation can be used at this stage, known by those skilled in the art, coupled to concentration techniques, such as, but now limited to, size classification. The final concentrate size must be smaller than 0.5 mm to ensure proper mixing during the dissolution stage.

After the ore is properly beneficiated, concentrated sulfuric acid (90-98%) is added to it in a sub-stoichiometric manner. Enough acid must be added to convert the rare earth elements, base and alkaline metals to sulfates. Some acid can be added to convert partially iron and aluminum to sulfates, but no more than 20%, preferably below 5%. This stage is known as sulfation. This operation can be done at any equipment known by those skilled in the art, such as, but not limited to, a pug mill. No heat is required at this stage, although it is not prejudicial. At this stage, sulfuric acid will attack the main elements present in the material, which are aluminum and iron and convert them to sulfates, as described by the following reactions.

$$Fe_2O_3 + 3H_2SO_4 \rightarrow Fe_2(SO_4)_3 + 3H_2O \qquad (I)$$

$$Al_2O_3 + 3H_2SO_4 \rightarrow Al_2(SO_4)_3 + 3H_2O \qquad (II)$$

The mixture of rare earth ore and aluminum and ferric sulfates is submitted to an operation where temperature is increased and the mixture is kept in motion for proper solid-solid contact. Those skilled in the art may choose the best equipment for this stage, such as, but not limited to, a rotary kiln. The mixture must be kept at a temperature between 620° C. and 750° C., preferably between 650° C. and 720° C. for 1 to 8 hours, preferably between 2 and 4 hours. At such conditions, iron and aluminum sulfates are converted into stable compounds, forming rare earth sulfates. The following reactions show the proposed mechanism for a lanthanum phosphate, but could be applied to other rare earth compound as well $$LaPO_4 + Fe_2(SO_4)_3 \rightarrow La_2(SO_4)_3 + FePO_4 \qquad (III)$$

$$LaPO_4 + Al_2(SO_4)_3 \rightarrow La_2(SO_4)_3 + AlPO_4 \qquad (IV)$$

Figure 3:
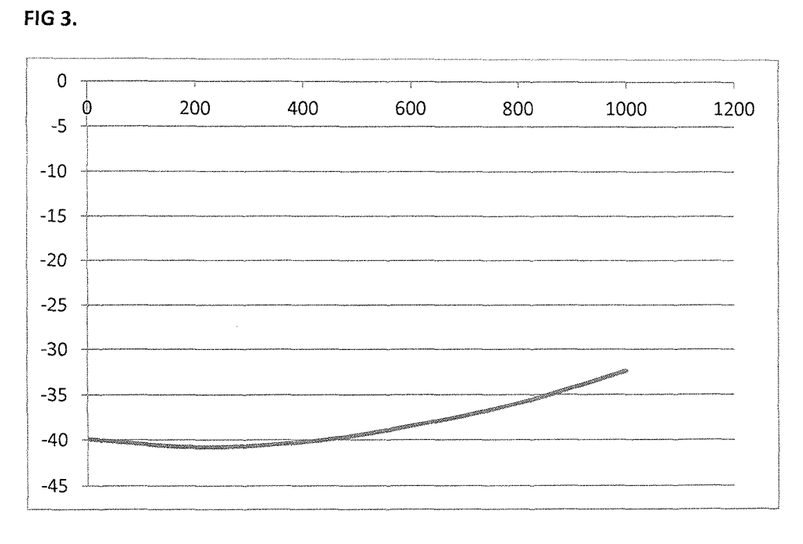
FIG. 3 is a graph illustrating Gibbs free energy of formation of lanthanum sulfate and ferric phosphate using ferric sulfate and lanthanum phosphate.
Figure 4:
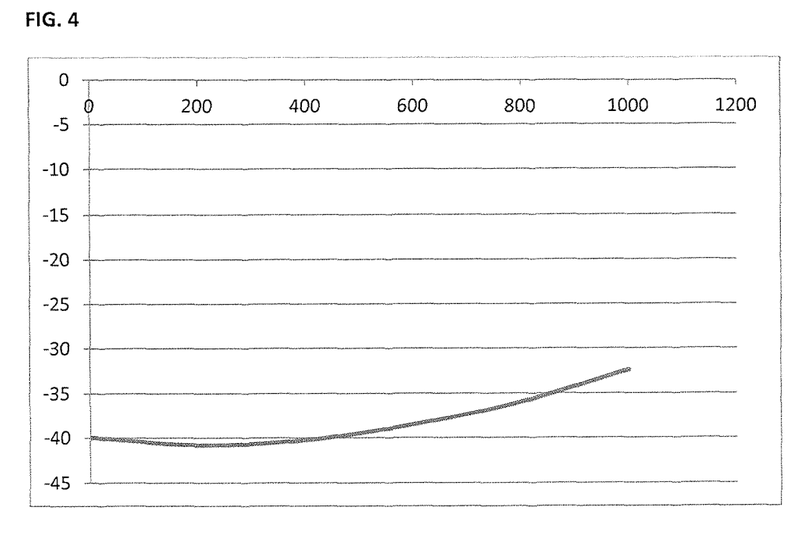
FIG. 4 is a graph illustrating Gibbs free energy of formation of lanthanum sulfate and aluminum phosphate using aluminum sulfate and lanthanum phosphate.

These reactions are thermodynamically favorable, as shown by the next tables respectively for equations III and IV and by FIG. 3 and FIG. 4. HSC 6.0 was used for thermodynamical calculations.

TABLE 1

Thermodynamical calculations for reaction III

| T °C. | deltaH kcal | deltaS cal/K | deltaG kcal | K | Log(K) |
|---|---|---|---|---|---|
| 0 | −33.001 | −4.410 | −31.796 | 2.771E+025 | 25.443 |
| 200 | −44.555 | −35.390 | −27.810 | 7.025E+012 | 12.847 |
| 400 | −60.697 | −63.671 | −17.837 | 6.189E+005 | 5.792 |
| 600 | −79.435 | −87.987 | −2.609 | 4.500E+000 | 0.653 |
| 800 | −99.833 | −108.996 | 17.137 | 3.234E−004 | −3.490 |
| 1000 | −121.550 | −127.538 | 40.825 | 9.802E−008 | −7.009 |

TABLE 2

Thermodynamical calculations for reaction IV

| T °C. | deltaH kcal | deltaS cal/K | deltaG kcal | K | Log(K) |
|---|---|---|---|---|---|
| 0 | −38.342 | 5.819 | −39.932 | 8.959E+031 | 31.952 |
| 200 | −40.329 | 1.016 | −40.810 | 7.107E+018 | 18.852 |
| 400 | −44.435 | −6.206 | −40.257 | 1.179E+013 | 13.071 |
| 600 | −47.667 | −10.503 | −38.497 | 4.331E+009 | 9.637 |
| 800 | −52.121 | −15.061 | −35.959 | 2.107E+007 | 7.324 |
| 1000 | −58.831 | −20.776 | −32.379 | 3.620E+005 | 5.559 |

Figure 2:
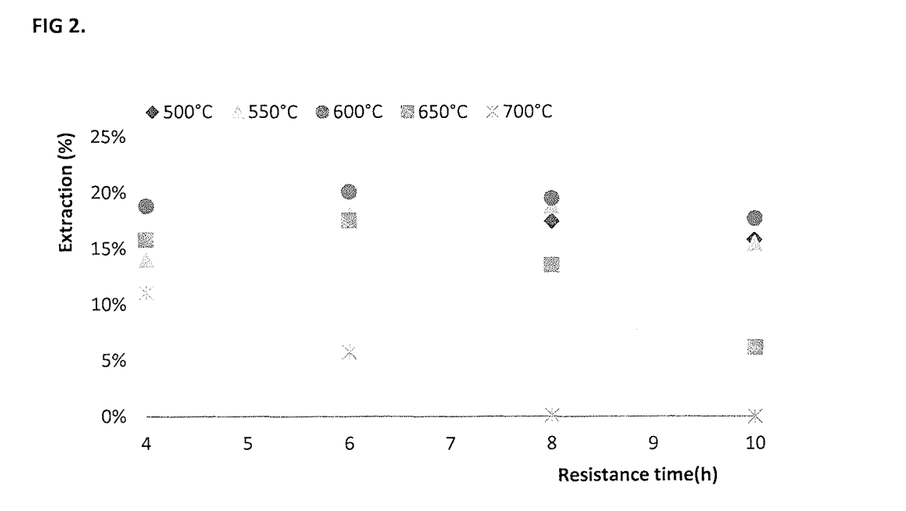
FIG. 2 is a graph illustrating the effect of temperature and time to aluminum extraction as a function of temperature and time, thus showing conversion of aluminum from sulfate into phosphate.

Even though thermodynamics show that reactions are favorable at low temperatures, experiments have shown that kinetics play a big role, especially for iron, that does not decompose at temperatures lower than 620° C. FIG. 1 and FIG. 2 illustrate the kinetics effect on temperature.

Figure 6:
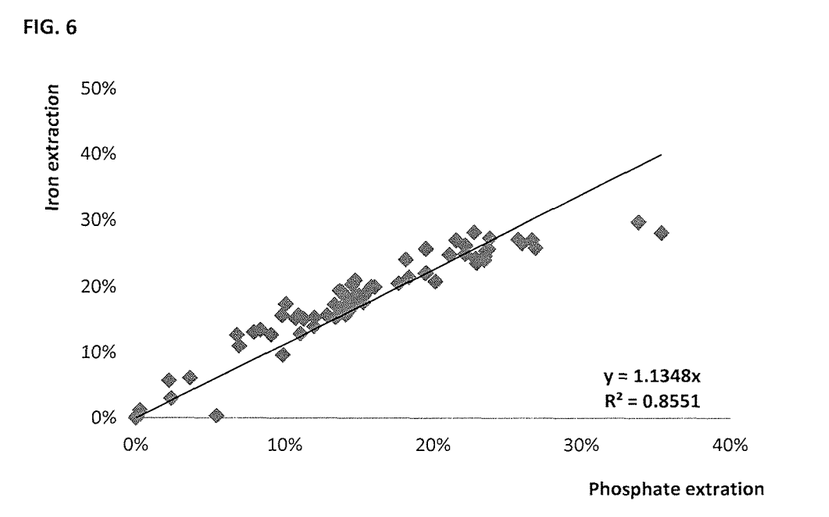
FIG. 6 is a graph illustrating the correlation of phosphate and iron extraction.
Figure 7:
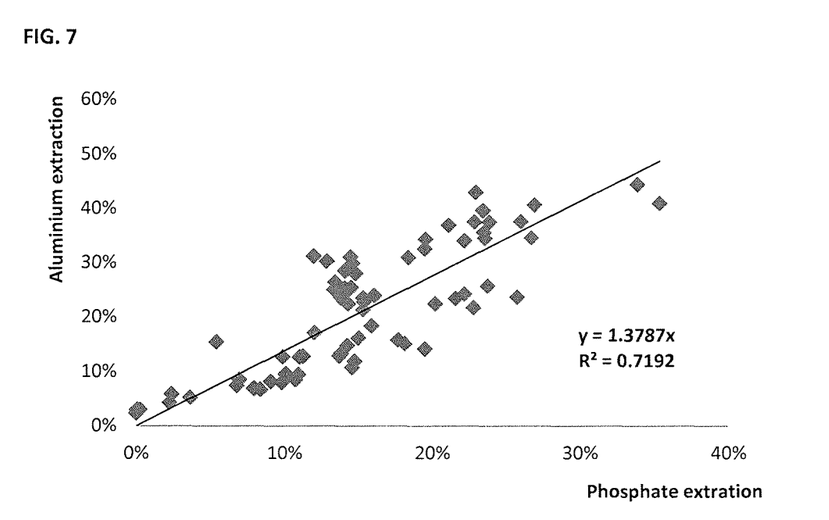
FIG. 7 is a graph illustrating the correlation of phosphate and aluminum extraction.
Figure 8:
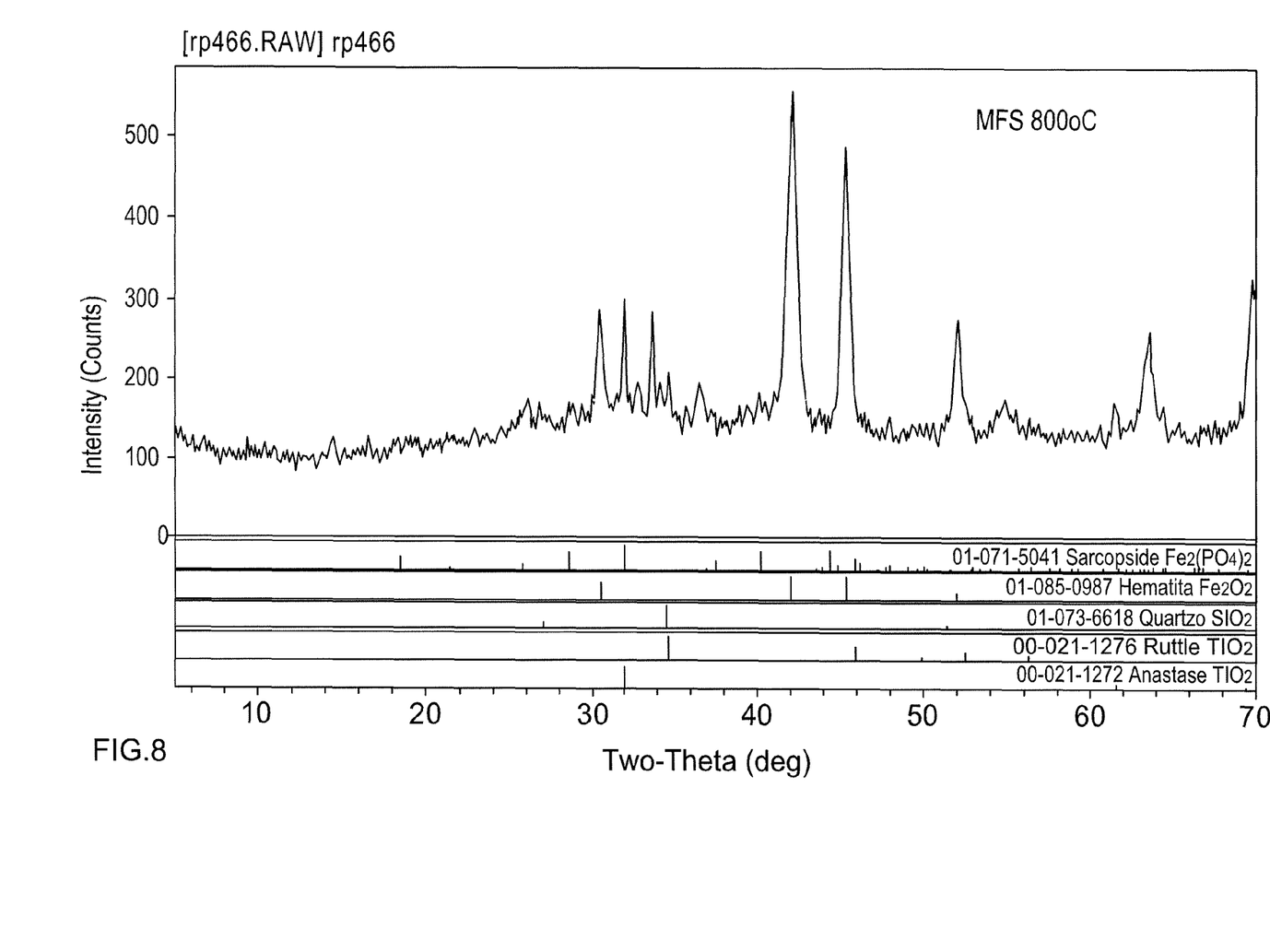
FIG. 8 is a figure of an X-ray diffractometry, showing the formation of ferric and aluminum phosphates after submitting the low grade ore to the proposed invention.

The kiln produces rare earth sulfates, which are readily soluble in water and stabilizes iron and aluminum, the main impurities usually found at a low grade rare earth ore as insoluble compounds as phosphates. FIG. 6 and FIG. 7 show the correlation between phosphate and iron/aluminum extraction and FIG. 8 shows an X-Ray difractometry of the kiln product and the formation of iron phosphate.

The kiln product is cooled at any way known by those skilled in the art. Cooling down is needed as rare earth sulfates reduce solubility with the increase of temperature. Therefore, cooling the calcine will reduce the increase in temperature during dissolution and reduce risks of losing rare earths due to that effect. Dissolution temperature must be kept below 50° C., preferably at 25° C. Enough water must be added to solubilize all the rare earth elements at the defined temperature and that fact is dependable on both temperature of the pulp and the grade of rare earths in the ore. A pulp with 1 to 50% solids, preferably between 5 and 20% is sufficient to achieve full rare earths dissolution.

After solid/liquid separation the clean rare earth solution can be taken to any operation known by those skilled in the art, such as, but not limited to, rare earth precipitation as hydroxides, followed by HCl leaching and solvent extraction, as shown at FIG. 5.

One advantage of the present disclosure is the ability of exploiting low grade rare earth ores, not amenable to conventional mineral concentration. These ores cannot be submitted to conventional rare earth extraction techniques, such as caustic cracking or sulfation as too much acid would be needed and the final PLS would contain too many impurities and their removal would also be very costly. This invention brings a process that is able to selectively attack rare earth minerals indirectly, producing a clear solution that is simple to treat and obtain final rare earth products.

The following examples are included for purposes of illustrating certain embodiments and aspects of the present disclosure. As such, the examples are not intended to limit the present disclosure in any matter whatsoever.

Figure 9:
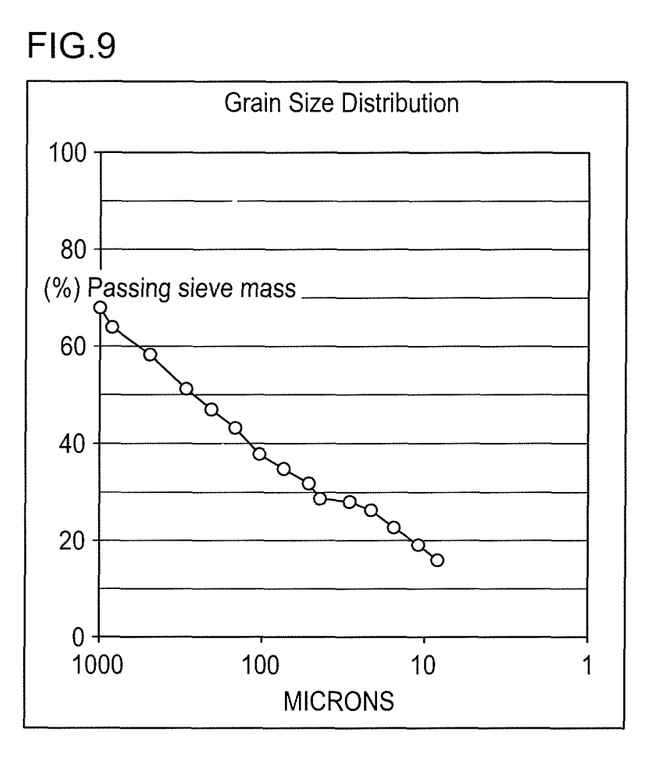
FIG. 9 is a cyclosizer graph.

Trial performed in a sample of ore from southeastern Brazil. The initial particle size distribution is illustrated in FIG. 9 and the following grain size distribution is shown in Table 3 below:

Grain size distribution

| Fraction (mm) | ETR | Rec ETR | Cumulative mass |
|---|---|---|---|
| <2 | 2.75% | 100.0% | 100% |
| <1 | 3.12% | 77.9% | 69% |
| <0.85 | 3.23% | 75.1% | 64% |
| <0.5 | 3.36% | 72.3% | 60% |
| <0.3 | 3.57% | 67.9% | 53% |
| <0.21 | 3.71% | 64.5% | 48% |
| <0.15 | 3.84% | 60.7% | 44% |
| <0.106 | 3.99% | 55.7% | 39% |
| <0.075 | 4.06% | 52.3% | 36% |
| <0.053 | 4.15% | 48.9% | 33% |
| <0.045 | 4.23% | 45.4% | 30% |

As it is possible observe, Table 3 indicates the infeasibility of sample upgrading.

Tables 4 and 5 are related to the complete grain size distribution:

TABLE 4

Grain size distribution

| Fraction (mm) | Al2O3 | Ba | CaO | Ce | Dy | Er | Eu | Fe2O3 | Ho | K2O | La | LOI | Lu | MgO |
|---|---|---|---|---|---|---|---|---|---|---|---|---|---|---|
| <2 | 4.6% | 1.8% | 2.7% | 1.1% | 0.01% | 0.00% | 0.01% | 47% | 0.002% | 0.07% | 0.69% | 5.8% | 0.00% | 0.64% |
| <1 | 5.3% | 2.0% | 2.8% | 1.3% | 0.01% | 0.00% | 0.01% | 45% | 0.002% | 0.07% | 0.79% | 6.5% | 0.00% | 0.53% |
| <0.85 | 5.4% | 2.1% | 2.8% | 1.3% | 0.01% | 0.00% | 0.01% | 44% | 0.002% | 0.08% | 0.82% | 6.7% | 0.00% | 0.50% |
| <0.5 | 5.5% | 2.1% | 2.8% | 1.4% | 0.01% | 0.00% | 0.01% | 43% | 0.002% | 0.08% | 0.85% | 6.9% | 0.00% | 0.46% |
| <0.3 | 5.8% | 2.1% | 2.8% | 1.4% | 0.01% | 0.00% | 0.01% | 42% | 0.002% | 0.08% | 0.90% | 7.4% | 0.00% | 0.42% |
| <0.21 | 6.0% | 2.1% | 2.8% | 1.5% | 0.01% | 0.00% | 0.01% | 42% | 0.002% | 0.08% | 0.93% | 7.7% | 0.00% | 0.39% |
| <0.15 | 6.1% | 2.0% | 2.7% | 1.6% | 0.01% | 0.01% | 0.01% | 43% | 0.002% | 0.08% | 0.96% | 8.0% | 0.00% | 0.37% |
| <0.106 | 6.3% | 2.0% | 2.6% | 1.6% | 0.01% | 0.01% | 0.01% | 43% | 0.002% | 0.08% | 0.99% | 8.4% | 0.00% | 0.36% |
| <0.075 | 6.5% | 2.0% | 2.5% | 1.6% | 0.01% | 0.01% | 0.01% | 44% | 0.002% | 0.08% | 1.00% | 8.7% | 0.00% | 0.35% |
| <0.053 | 6.7% | 2.0% | 2.4% | 1.7% | 0.02% | 0.01% | 0.01% | 45% | 0.002% | 0.08% | 1.01% | 9.0% | 0.00% | 0.35% |
| <0.045 | 6.8% | 1.9% | 2.4% | 1.7% | 0.02% | 0.01% | 0.01% | 46% | 0.002% | 0.08% | 1.02% | 9.3% | 0.00% | 0.34% |

TABLE 5

Grain size distribution

| Fraction (mm) | MnO | Nb | Nd | P2O5 | Pr | SiO2 | Sm | Sr | Th | TiO2 | Tm | U | V | Yb | Zr |
|---|---|---|---|---|---|---|---|---|---|---|---|---|---|---|---|
| <2 | 0.81% | 0.37% | 0.35% | 4.0% | 0.11% | 17% | 0.04% | 0.32% | 0.06% | 12.7% | 0.000% | 0.004% | 0.044% | 0.002% | 0.20% |
| <1 | 0.81% | 0.43% | 0.40% | 4.6% | 0.13% | 17% | 0.04% | 0.35% | 0.07% | 12.3% | 0.000% | 0.004% | 0.042% | 0.003% | 0.26% |
| <0.85 | 0.79% | 0.44% | 0.41% | 4.7% | 0.13% | 18% | 0.04% | 0.36% | 0.07% | 11.9% | 0.001% | 0.004% | 0.041% | 0.003% | 0.27% |
| <0.5 | 0.78% | 0.45% | 0.42% | 4.8% | 0.14% | 18% | 0.05% | 0.37% | 0.07% | 11.5% | 0.001% | 0.004% | 0.040% | 0.003% | 0.28% |
| <0.3 | 0.75% | 0.47% | 0.45% | 5.0% | 0.14% | 19% | 0.05% | 0.38% | 0.08% | 10.7% | 0.001% | 0.004% | 0.037% | 0.003% | 0.29% |
| <0.21 | 0.74% | 0.47% | 0.47% | 5.1% | 0.15% | 19% | 0.05% | 0.39% | 0.08% | 10.2% | 0.001% | 0.004% | 0.036% | 0.003% | 0.30% |
| <0.15 | 0.73% | 0.49% | 0.48% | 5.3% | 0.16% | 19% | 0.05% | 0.39% | 0.08% | 9.7% | 0.001% | 0.004% | 0.035% | 0.003% | 0.32% |
| <0.106 | 0.72% | 0.49% | 0.50% | 5.4% | 0.16% | 18% | 0.06% | 0.40% | 0.09% | 9.0% | 0.001% | 0.004% | 0.034% | 0.003% | 0.33% |
| <0.075 | 0.71% | 0.49% | 0.51% | 5.5% | 0.16% | 17% | 0.06% | 0.40% | 0.09% | 8.6% | 0.001% | 0.004% | 0.033% | 0.003% | 0.34% |
| <0.053 | 0.71% | 0.50% | 0.52% | 5.6% | 0.17% | 16% | 0.06% | 0.41% | 0.09% | 8.1% | 0.001% | 0.004% | 0.033% | 0.003% | 0.35% |
| <0.045 | 0.70% | 0.50% | 0.53% | 5.7% | 0.17% | 15% | 0.06% | 0.41% | 0.09% | 7.7% | 0.001% | 0.004% | 0.033% | 0.003% | 0.36% |

The complete grain size distribution tables disclose acid consuming impurities (Fe, Al, Mg, Ca) in sulfation process and possible caustic consuming (Al e Si) in alkaline process.

In order to apply this new claimed technique, the sample was crushed until be 100% less than 0.5 mm. In the next step, it was dried at 120° C.

The R variable was created with the following definition for better understanding:

R=[(H2SO4 Mass)/(ROM Mass)]×1000

800 grams of dry ore were placed in a metallic reactor and, slowly, concentrated sulfuric acid was added in this reaction. The addition of concentrated sulfuric acid was slow and constantly mixed to prevent sludge or clusters formation.

In the next step, the sulfated mass was transferred to zirconite vessel, which was capped and placed in a muffle following a heating curve of 200° C./h.

Important parameters such as temperature, time, and R variable were evaluated and the results are detailed below:

Example 01

Varying temperature and keeping constant residence time and R:

| Rare Earth extraction (%) | | |
|---|---|---|
| Fe | Al | TR |
| 39.6 | 55.3 | 80.4 |
| 38.5 | 57.8 | 82.1 |
| 0.3 | 7.9 | 82.4 |

There is no noticeable improvement at 720° C. in relation to extraction; however there is considerable improvement in iron and aluminum insolubility.

Example 02

Varying time and keeping constant temperature and R:

| Rare Earth extraction (%) | | |
|---|---|---|
| Fe | Al | TR |
| 35.8 | 59.8 | 83.1 |
| 38.7 | 58.1 | 83.8 |

-continued

| Rare Earth extraction (%) | | |
|---|---|---|
| Fe | Al | TR |
| 12.2 | 21.9 | 81.3 |
| 26.7 | 53.6 | 87.7 |

The table indicates that there is a relation between rare earth extraction and time, however there is no relation between iron and aluminum fixation and time.

Example 03

Varying R and keeping constant residence time and temperature:

| Rare Earth extraction (%) | | |
|---|---|---|
| Fe | Al | TR |
| 39.6 | 55.3 | 80.4 |
| 49.3 | 55.8 | 85.3 |
| 38.5 | 57.8 | 82.1 |
| 35.8 | 59.8 | 83.1 |
| 12.2 | 21.9 | 81.3 |
| 0.4 | 5.5 | 72.6 |
| 0.3 | 7.9 | 82.4 |
| 7.7 | 25.3 | 88.5 |

As expected there is a strong relationship between R and rare earths extraction.

Example 04

Varying all parameters:

| Rare Earth extraction (%) | | |
|---|---|---|
| Fe | Al | TR |
| 39.6 | 55.3 | 80.4 |
| 49.3 | 55.8 | 85.3 |
| 41.5 | 56.5 | 79.9 |
| 41.1 | 48.9 | 85.0 |
| 38.5 | 57.8 | 82.1 |
| 35.8 | 59.8 | 83.1 |
| 38.7 | 58.1 | 83.8 |
| 12.2 | 21.9 | 81.3 |
| 26.7 | 53.6 | 87.7 |
| 0.4 | 5.5 | 72.6 |
| 0.3 | 7.9 | 82.4 |

-continued

| Rare Earth extraction (%) | | |
|---|---|---|
| Fe | Al | TR |
| 7.7 | 25.3 | 88.5 |
| 1.0 | 3.6 | 58.4 |
| 0.5 | 2.6 | 64.5 |
| 0.7 | 9.8 | 81.4 |

The invention claimed is:

1. A method for recovering a rare earth element from ore including a first group of metals selected from a group consisting of at least one of iron and aluminum, and a second group of metals selected from a group consisting of at least one of the following rare earth elements: lanthanum, cerium, praseodymium, neodymium, promethium, samarium, europium, gadolinium, terbium, dysprosium, holmium, erbium, thulium, ytterbium, lutetium, yttrium and scandium, the method comprising:
drying the ore at a temperature from 20° C. to 150° C.;
contacting the ore with a sub-stoichiometric amount of sulfuric acid to obtain a mixture of ore and sulfates of the first group of metals;
subjecting the mixture to a temperature between 620° C. and 750° C. to convert the sulfates of the first group of metals into a stable species and the second group of metals into sulfates, thereby obtaining a mixture of impurities and rare earth sulfates;
adding water to the mixture of impurities and rare earth sulfates, selectively dissolving the rare earth sulfates and forming a rare earth solution; and
subjecting the rare earth solution to a purification process.

2. The method according to claim 1, wherein the ore contains monazite, bastnasite or other rare earth-bearing mineral.

3. The method according to claim 1, further comprising increasing the grade and reducing the size of the ore prior to the contacting.

4. The method according to claim 3, wherein the reducing of the size of the ore comprises reducing to 0.5 mm or smaller.

5. The method according to claim 1, wherein the contacting further comprises mixing the ore with concentrated (90-98%) sulfuric acid.

6. The method, according to claim 5, that the acid added is calculated taking into consideration all alkali and earth-alkali metals present and the rare earth elements plus an excess of 0 to 50%.

7. The method according to claim 1, wherein the temperature of the subjecting of the mixture is applied for between 1 and 12 hours.

8. The method according to claim 1, wherein the selectively dissolving of the rare earth elements comprises cooling to a dissolution temperature of 25° C., and wherein the rare earth solution has a pulp density of no more than 15% by weight solids.

9. The method according to claim 1, wherein rare earth solution pH must not be higher than 5 but not lower than 1.5.

10. The method according to claim 1, wherein the selectively dissolving has a residence time between 15 and 150 minutes.

11. The method according to claim 1, wherein the temperature of the subjecting of the mixture is between 650° C. and 720° C.

12. The method according to claim 1, wherein the sub-stoichiometric amount converts no more than 20% of the iron or aluminum by weight into sulfates.

13. The method according to claim 1, wherein the sub-stoichiometric amount converts no more than 5% of iron or aluminum by weight into sulfates.

14. A method for recovering a rare earth element from ore including a first group of metals selected from a group consisting of at least one of iron and aluminum, and a second group of metals selected from a group consisting of at least one of the following rare earth elements: lanthanum, cerium, praseodymium, neodymium, promethium, samarium, europium, gadolinium, terbium, dysprosium, holmium, erbium, thulium, ytterbium, lutetium, yttrium and scandium, the method comprising:
drying the ore at a temperature from 20° C. to 150° C.;
contacting the ore with a sub-stoichiometric amount of sulfuric acid to obtain a mixture of ore and sulfates of the first group of metals, wherein the sub-stoichiometric amount converts no more than 20% of iron or aluminum by weight into sulfates after heating the mixture;
subjecting the mixture a temperature between 650° C. and 750° C. to convert the sulfates of the first group of metals into a stable species and the second group of metals into sulfates, thereby obtaining a mixture of impurities and rare earth sulfates;
adding water to the mixture of impurities and rare earth sulfates, selectively dissolving the rare earth sulfates and forming a rare earth solution; and
subjecting the rare earth solution to a purification process.

15. A method for recovering a rare earth element from ore including a first group of metals selected from a group consisting of at least one of iron and aluminum, and a second group of metals selected from a group consisting of at least one of the following rare earth elements: lanthanum, cerium, praseodymium, neodymium, promethium, samarium, europium, gadolinium, terbium, dysprosium, holmium, erbium, thulium, ytterbium, lutetium, yttrium and scandium, the method comprising:
drying the ore at a temperature from 20° C. to 150° C.;
contacting the ore with a sub-stoichiometric amount of sulfuric acid to obtain a mixture of ore and sulfates of the first group of metals, wherein the sub-stoichiometric amount converts no more than 20% of iron or aluminum by weight into sulfates;
subjecting the mixture a temperature sufficient to convert the sulfates of the first group of metals into a stable species and the second group of metals into sulfates, thereby obtaining a mixture of impurities and rare earth sulfates;
adding water to the mixture of impurities and rare earth sulfates, selectively dissolving the rare earth sulfates and forming a rare earth solution; and
subjecting the rare earth solution to a purification process.

* * * * *